(No Model.)

W. I. TWOMBLY.
MOTOR FOR VEHICLES.

No. 542,319. Patented July 9, 1895.

Witnesses:
Frank H. Verrill
William Henry Clifford

Inventor:
Willard I. Twombly,
by Verrill and Clifford
attys

UNITED STATES PATENT OFFICE.

WILLARD I. TWOMBLY, OF PORTLAND, MAINE, ASSIGNOR OF ONE-HALF TO BENJAMIN S. LOVELL, OF BOSTON, MASSACHUSETTS.

MOTOR FOR VEHICLES.

SPECIFICATION forming part of Letters Patent No. 542,319, dated July 9, 1895.

Application filed August 31, 1894. Serial No. 521,793. (No model.)

*To all whom it may concern:*

Be it known that I, WILLARD I. TWOMBLY, a citizen of the United States of America, residing at Portland, in the county of Cumberland and State of Maine, have invented certain new and useful Improvements in Motors for Vehicles, &c.; and I do hereby declare the following to be a full, clear, and exact description of the invention, such as will enable others skilled in the art to which it appertains to make and use the same.

My invention relates to improvements in means of propulsion for vehicles, and more particularly for bicycles; but it is applicable to other road-machines, to vessels, and to stationary engines.

It consists in the application of ether or other volatile substance as a motive force in the manner hereinafter described.

It further consists in the combination, with a vehicle, of an engine for propelling it, said engine being adapted to be driven by ether or other volatile substance.

It further consists in mechanism for automatically regulating the supply of fuel for heating the boiler.

It further consists in certain details of construction, which will be hereinafter more fully described.

The drawings show my invention as applied to a bicycle.

Figure 1:
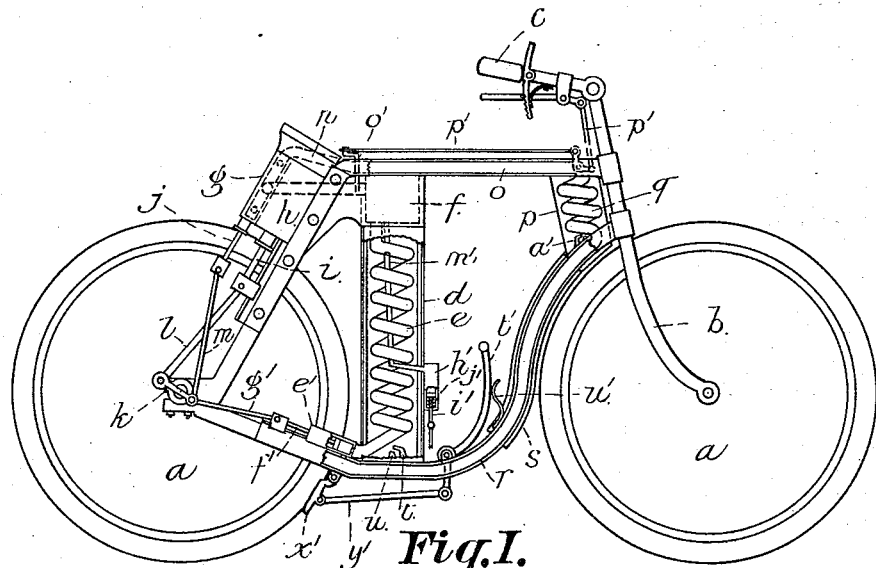
Figure 4:
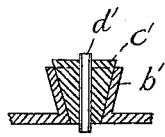
Figure 2:
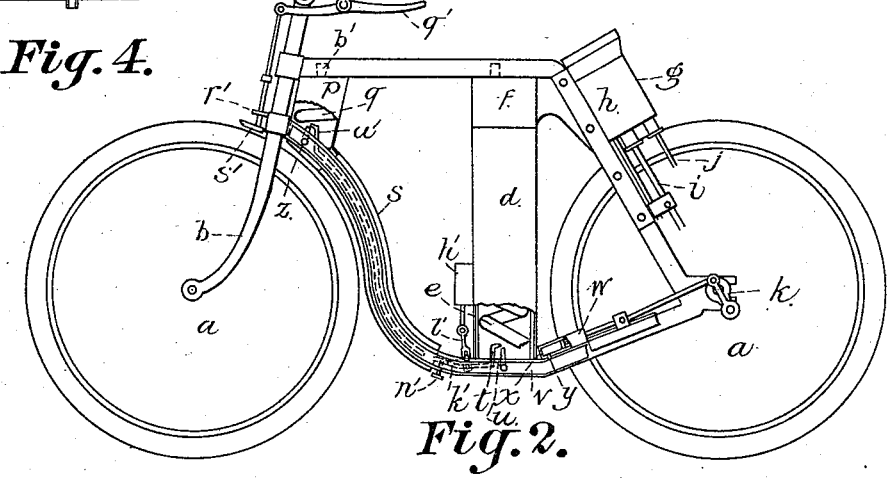
Figure 3:
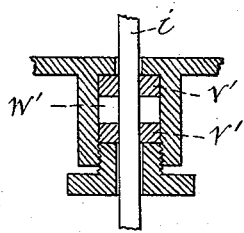

In said drawings, Figure 1 is a side elevation, with parts broken out, of the right side of a bicycle embodying my improvement. Fig. 2 is a side elevation, with parts broken out, of the left side of the same. Fig. 3 is a detail showing the construction of the stuffing-box of the engine, and Fig. 4 is a sectional detail showing air-vent and supply-opening in the condenser-case.

Same letters refer to like parts.

In said drawings, $a$ represents the wheels of a bicycle, $b$ the forward fork, and $c$ the handles to said fork, said fork being pivoted in the front of the frame. The frame is double and made of the usual hollow tubing arranged in any convenient manner. Supported by the frame is a boiler composed of a suitable case $d$, having within a coil of pipe $e$, terminating at the top in a steam-chest $f$, which is in communication with the steam-chests $g$ of engines $h$, mounted on the rear part of the frame, said case $d$ extending backward and covering the top of the engines. The engines, one each side of the rear wheel, have pistons $i$ and a cut-off valve $j$. The pistons are connected to cranks $k$ on the axle by connecting-rods $l$, and the cut-off valves are connected to said cranks by connecting-rods $m$. The exhaust from the engines may be through pipe $n$ and thence into the hollow frame $o$ on the right side at the top.

At the front of the frame near the forward fork is arranged a condenser composed of a jacket $p$ in which is a coil of pipe $q$ opening into the frame $o$ and terminating at the bottom on the right-hand side in the hollow portion of the frame $r$.

Between the frames beneath the condenser is a tank $s$, which contains the fuel, which may be naphtha, gasoline, or other combustible volatile substance, said tank being continuous with the condenser-jacket. Leading from said tank to a point beneath the coil of pipe in the boiler is a burner $t$, which may terminate over an orifice $u$ in the conduit $v$, and through which a blast of air is forced by means of an air-pump $w$, operated by connection with the crank $k$ on the left side, the hollow frame on the left side serving as a conduit for said blast. Said air-pump has a supply-valve $x$ and a valve $y$ opening into the hollow frame when the air-pump is in operation. Leading out of the hollow frame on the lower left-hand side is a nipple $z$, and leading from the fuel-tank and terminating over the orifice in said nipple is an atomizer-pipe $a'$. The pump fills the hollow frame with compressed air, thus causing a spray of gasoline or other fluid from the fuel-tank to be thrown against the condenser-coil, which, after condensing, falls back into the tank. In the top of the condenser-jacket is a supply-opening $b'$, closed by a stopper $c'$, having a small air-vent $d'$. Attached to the bottom of the frame on the right side is a force-pump $e'$, having a plunger $f'$ and connecting-rod $g'$, connected to and operated by connection with crank $k$ on the right-hand side. Said pump has a valve opening into the coil in the boiler and also into the hollow lower portion of the frame on the right side.

Inasmuch as the motive power must be produced by a volatile substance, it becomes of the utmost importance to have a nicely-adjusted and automatically-operated gage to regulate the pressure in the boiler or steam-chest. For this purpose I place a cylinder $h'$ in a convenient position. In said cylinder is a piston $i'$, controlled in one direction by a spring $j'$ and connected to and operating a valve $k'$ in the conduit, which furnishes fuel to the burner by a suitable connecting-rod $l'$. A pipe $m'$, open to the steam-chest in the boiler, leads into the cylinder above the piston, and, as the pressure in the steam-chest increases or diminishes, it operates the piston in the gage and opens or closes the valve in the fuel-supply conduit more or less and lessens or increases the supply of fuel, thus keeping the pressure at any desired degree. To shut off completely the supply of fuel from the burner, a valve $n'$ is inserted in the supply-conduit.

The throttle-valve $o'$ inserted in the steam-pipe leading from the steam-chest of the boiler to the steam-chest of the engines is operated by a series of levers $p'$, the last of which is pivotally attached to the handle on the right side.

Inasmuch as the motive fluid is exceedingly volatile and is to be used over and over again, it is important to prevent waste.

The stuffing-boxes for the pistons are constructed, as seen in Fig. 3, with a packing which consists of two sections of waste $v'$, with an intermediate section $w'$ of glycerine or other similar fluid. Pivotally attached to the handle on the left side is a brake-lever $q'$, the lower section passing through a sleeve $r'$ and terminating in a brake-shoe $s'$, adapted to press upon the rim of the forward wheel. Pivotally connected to the frame at or near the bottom is a brake lever $t'$ to be operated by the fork, one end being linked to a brake-shoe pivoted to the frame and adapted to be pressed against the forward wheel by said lever. Said shoe is held away from the wheel normally by a spring $u'$ located behind the lever.

The operation of my improved vehicle is as follows: The coil-pipe forming the boiler is filled with ether through a supply-opening in the top thereof. The fuel-tank is filled with naphtha, gasoline, or other combustible and volatile material. The supply-valve in the bottom of the fuel-tank is opened and the jet beneath the boiler is ignited. As soon as the ether becomes heated, as it does at a very low temperature, it becomes converted into vapor, passes from the steam-chest to the engine, setting in operation the piston, and rotating the wheels of the vehicle. At the same time it sets in operation the air-pump and the force-pump. The ether-vapor passes from the steam-chest through the exhaust to the condenser-coil at the front of the machine and is there condensed by a spray of some volatile substance thrown upon it by the atomizer, thence passes down through the hollow frame on the lower right side to a point at or near the bottom of the boiler, whence it is taken up into the force-pump and forced again into the boiler. The air-pump continually taking up air forces it in a blast through the orifice beneath the end of the sprayer, and thus forces a spray of some volatile substance from the fuel-tank through the pipe upon the condenser-coils. This condenses the ether-vapor much more rapidly than it otherwise would. The hood or case surrounding the boiler, steam-chest, and engines tends to retain the heat and thus keep the engine and boiler hot. The temperature can be regulated automatically by the gage before described, the plunger being connected with the valve which regulates the supply of fuel to the burner. The pressure on said plunger operates to close said valve, while the spring beneath the piston tends to force the plunger upward and open the valve. The operation of the engine and cut-off is substantially the same as in ordinary engines.

Instead of the frame being hollow and serving as a conduit for the exhaust from the engine to the condenser and from the condenser to the boiler, a separate pipe may be used. A separate pipe may also be used for the conduit for the air-blasts. It is, however, very convenient to use the frame for this purpose, and the cost, bulk, and weight are lessened thereby.

The advantages of this machine are numerous and substantial. It can be easily and readily set in motion. Its speed can be regulated to a nicety. The pressure on the engine can be regulated automatically. The motive fluid can be used repeatedly, thus rendering it unnecessary to carry a large weight. The same fluid used for heating the boiler can be used as a spray in the operation of condensation. A vehicle thus constructed is specially adapted for long journeys on the public highways, and inasmuch as the rider has only to guide the machine and regulate the valves he can carry a considerable weight.

Having thus described my invention and its use, I claim—

1. A motor comprising a boiler, engine, tank adapted to contain a combustible volatile fluid and condenser, a pump mechanism operated by said engine and adapted to re-convey the motive fluid after condensation into the boiler, and an air pump operated by said engine and adapted to force a spray of the volatile fluid upon the condenser, substantially as and for the purposes set forth.

2. In a vehicle, a motor comprising an engine, boiler and condenser, an exhaust pipe leading from the engine to the condenser, a fuel tank supported in said vehicle, a force-pump operated by said engine and adapted to re-convey the motive fluid after condensation to the boiler, a burner located beneath said boiler and receiving its fuel supply from said fuel tank, an atomizer consisting of a pipe leading from the fuel tank and terminating beneath the condenser, and an air pump adapted to force a spray of the fuel from the atomizer upon the condenser, substantially as and for the purposes set forth.

3. In a vehicle, a double frame made hollow, a boiler, engine and condenser mounted on said frame, an exhaust pipe leading from the engine into said frame and thence through said frame to the condenser, a conduit leading from said condenser to the boiler forward by the lower part of said hollow frame, and a force pump adapted to take up the motive fluid from said conduit and re-convey it to the boiler, substantially as and for the purposes set forth.

4. In a vehicle, the combination with wheels and a suitable frame, of an engine, boiler and condenser mounted upon said frame, said frame being hollow and serving as a conduit from the exhaust to the condenser and from the condenser to the boiler, substantially as and for the purposes set forth.

5. In a vehicle, the combination with wheels and a hollow double frame, arranged one on each side of said wheels, of a boiler, engine and condenser mounted on said frame, the top of said hollow frame serving as a conduit from the exhaust to the condenser, the bottom on one side serving as a conduit from the condenser to the boiler and on the other side serving as a conduit for an air blast to feed air to the burner and to the atomizer, whereby a spray of volatile fluid is thrown upon the condenser, substantially as and for the purposes set forth.

6. In a vehicle, the combination with an engine, boiler and condenser mounted on said vehicle, a fuel tank mounted in said vehicle and formed continuous with the condenser case, an atomizer leading from said fuel tank to a point beneath the condenser coil, and means for automatically forcing a blast of air across the orifice of the atomizer, and upon the condenser, substantially as and for the purposes set forth.

7. In a vehicle, the combination with a suitable frame and wheels, of an engine, boiler and condenser mounted on said frame, a burner adapted to supply heat to said boiler and a continuous jacket surrounding said boiler and engine, substantially as and for the purposes set forth.

In testimony whereof I affix my signature in presence of two witnesses.

WILLARD I. TWOMBLY.

Witnesses:
ELGIN C. VERRILL,
NATHAN CLIFFORD.